Patented Apr. 12, 1949

2,467,196

UNITED STATES PATENT OFFICE 2,467,196

MANUFACTURE OF ARTIFICIAL FIBERS

Melvin A. Dietrich, Claymont, Del., assignor to E. I. du Pont de Nemours & Company, Wilmington, Del., a corporation of Delaware No Drawing. Application July 26, 1946,
Serial No. 686,442

4 Claims. (Cl. 18—54)

This invention relates to an improved process for the manufacture of fibers of hydroxyl-containing polymers. More particularly, this invention relates to the production of fibers of improved properties from hydrolyzed ethylene/vinyl acetate interpolymers.

Hydrolyzed ethylene/vinyl ester interpolymers have been described in U. S. Patent 2,386,347. Particularly useful for many applications are fibers from polymers having a relatively high hydroxyl content. These fibers after orientation have a high tensile strength and a high softening point. They are also resistant to organic solvents such as are used in the dry-cleaning industry. Although the hydrolyzed ethylene/vinyl ester interpolymers are not dissolved by water at 0°–50° C., those having a relatively high hydroxyl content may be dissolved by water at a hot (above 80° C.) aqueous solution. Such aqueous solutions have been dry spun (i. e., by injection of a fine stream in heated chamber with rapid evaporation of the aqueous solution) to give fibers. After orientation, the sensitivity of the fibers to water has been decreased by crosslinking such as with formaldehyde.

These hydrolyzed interpolymers which can be spun from aqueous solutions have, in accordance with the above mentioned patent, the empirical formula $$(C_2H_4)_x \cdot (C_2H_3OH)_y \cdot (C_2H_3OR)_z$$

in which R is an acyl radical of an organic monocarboxylic acid and $x$, $y$, and $z$ are numbers, the ratio of $y$ to $z$ being at least 4 to 1 (i. e., 80% hydrolyzed and preferably completely hydrolyzed) and the ratio of $y+z$ to $x$ being within the range of from 6:1 to 50:1.

In studying the wet spinning of aqueous solutions of hydrolyzed ethylene/vinyl ester interpolymers, difficulties have been encountered in obtaining aqueous solutions suitable for the wet spinning of the fibers. These difficulties have included the preparation of homogeneous solutions free from gel particles and graininess. The aqueous solutions are difficult to filter before use and tend to plug filter cloths and spinnerets during the spinning operation.

This invention has as an object a process for overcoming the difficulties referred to above, i. e., a process for obtaining fibers of improved properties from aqueous solutions of hydrolyzed ethylene/vinyl ester copolymers. Other objects will appear from the description given hereinafter.

These objects are accomplished by the preparation of filamentary material by a process which comprises wet spinning an aqueous solution of a hydrolyzed ethylene/vinyl ester interpolymer, said solution containing 2–10% by weight of a water-soluble compound having the formula RnX where R is a lower aliphatic radical, and X is one of the radicals —OH, SH, —NH₂, =NH, or ≡N, and $n$ is an integer of 1 to 3 whose value is equivalent to the valence of X. The lower aliphatic radicals comprise those having from 1 to 5 carbon atoms, and are preferably alkyl or alkylene.

Compounds corresponding to the above formula are the lower aliphatic water soluble alcohols, thiols and amines and include methyl, ethyl, propyl, butyl, isobutyl alcohols, ethylene glycol, thioglycolic acid, 3-mercaptopropanol, trimethyl, diethyl, propyl, and butyl amines. Compounds having more than one of the functional groups can be used. The preferred compounds, from the standpoint of improvement in properties, freedom from undesirable odors and cost, are the alcohols.

The following examples further illustrate the practice of this invention. In the examples, the parts given are by weight.

Example I

Three solutions of a hydrolyzed ethylene/vinyl acetate interpolymer (containing 5% ethylene) were prepared with the following compositions:

| Components | Solution | | |
|---|---|---|---|
| | A | B | C |
| Polymer | 15.4 | 15.4 | 15.4 |
| Water | 84.6 | 77.3 | 82.6 |
| Ethyl Alcohol | | 7.3 | |
| Thioglycolic Acid | | | 2.0 |

These mixtures were stirred mechanically for 2–3 hours at 95° to 100° C. under a reflux condenser, cooled, allowed to stand 24 hours, filtered under pressure through a cotton filter, allowed to stand another 24 hours, and filtered again. The solutions were deaerated and then spun into yarn. In the spinning operation the solution was pumped through a 60 hole spinneret (0.003 in. hole diameter) at a rate of 3.0 cc. per minute into an aqueous coagulating bath composed of 45% monosodium diacid phosphate saturated with octadecyl trimethyl ammonium bromide. The yarn travelled through the bath at 25° C. for a distance of 60 inches after which it was picked up by the Godet wheel at a rate of approximately 31 feet per minute. From the Godet wheel to the wind-up bobbin the yarn was stretched in air at a ratio of 3.66 to 1. The wind-up rate was 115 feet per minute. The yarn on the bobbin was washed in water until free of coagulating bath salts. A finish was then applied, the yarn dried, and drawn at 212°-215° C. through a hot air chamber at a stretch ratio of 2.8 to 1. Tenacities were determined on the yarn from the three solutions, using the standard Suter machine, and are listed below.

|  | Solution Composition | | |
|---|---|---|---|
|  | A | Water-Alcohol B | Water-Thioglycolic Acid C |
| Tenacity, gms./denier | 9.5 | 10.2 | 10.9 |
| Elongation at break, percent | 5.5 | 5.1 | 5.3 |

*Example II*

Solutions of hydrolyzed ethylene/vinyl acetate in water and water-alcohol (92.7:7.3) were prepared in the same concentrations given in Example I but were mixed by passage through a homogenizer to reduce the number of gel particles to a minimum. After spinning and drawing through hot air as in Example I, the yarn tenacities and elongations were found to be as follows:

| Solution Composition | Hot Air Draw Ratio | Tenacity, g./d. | Elongation, percent |
|---|---|---|---|
| Water | 2.8 | 10.1 | 5.7 |
| Water-Alcohol | 2.5 | 10.9 | 5.2 |

In these two examples, it will be noted that the presence of the additive in the spinning solution resulted in a 7 to 10% increase in tenacity.

Gel particle studies have shown that aqueous polymer solutions containing 2 to 10% of ethyl alcohol, dibutyl alcohol, N-butylamine and thioglycolic acid possessed fewer gel particles than a control solution without additive. Further examinations carried out by light scattering methods and light transmission at wave length of 546 microns demonstrated the superiority of the solutions containing lower aliphatic alcohols, amines, and mercaptans.

The preparation of the interpolymers used in this invention has been described in U. S. Patent 2,386,347. Of the hydrolyzed ethylene/vinyl ester interpolymers, those useful in this invention have at least 80% of the ester groups hydrolyzed to hydroxyl groups and preferably are more than 98% hydrolyzed and have a molar ratio prior to hydrolysis of vinyl ester to ethylene of between 6:1 to 50:1 although the interpolymers most useful vary in ratio of from 6:1 to 25:1. The vinyl ester particularly useful in the preparation of the interpolymer is vinyl acetate, although other 1-6 carbon alkanoic acid vinyl esters, e. g., vinyl propionate, vinyl butyrate, vinyl hexanoate, etc., may be employed as described in the above mentioned patent. These hydrolyzed ethylene/vinyl ester interpolymers are contained in the aqueous spinning solution in amount of from about 5% to about 30% of the weight of the solution.

In order to obtain the desired results the amount of the water soluble aliphatic compound should not be appreciably less than 2% by weight of the aqueous spinning solution. When the amount rises above 10% solubility of the hydrolyzed interpolymer is reduced, and proper coagulation of the interpolymer in the aqueous salt bath is interfered with.

Properties of the resulting filaments are superior with respect to tenacity and drawing qualities when the aqueous coagulating bath solution consists of monosodium dihydrogen phosphate ($NaH_2PO_4$) having a specific gravity of between 1.38 and 1.42 at 25° C. Less preferred salts that can be used in aqueous solution to coagulate the filaments include other inorganic alkali metal salts such as sodium sulfate, disodium hydrogen phosphate, zinc sulfate, potassium sulfate, ammonium chloride and mixtures of these compounds. The salt bath should have a high concentration of salt to precipitate the filaments of hydroxylated polymer from solution. In most instances this concentration is 25% to 100% saturation. When the salt bath contains a cationic surface active agent such as cetyl trimethyl ammonium bromide, tenacities of the resulting filaments are usually 2-3% higher. These cationic surface active compounds are described in British Patent 499,334 and include cetyl pyridinium bromide, stearamidophenyltrimethyl ammonium methosulfate, beta-aminoethylstearate hydrochloride and dodecyl piperidine hydrochloride. The coagulating bath should be saturated with respect to the cationic surface active agent. The amounts of the agent range from 0.005 to 0.05% or more based on the weight of the bath and give improved properties, particularly with regard to tenacity and elongation.

The spinning of hydrolyzed ethylene/vinyl acetate interpolymers in accordance with the present invention is accompanied by a number of valuable advantages. The number of gel particles in the spinning solution is reduced which permits uniform spinning with less clogging of filter cloths and spinnerets. In addition the yarn obtained possesses increased tenacity. These yarns, particularly after treatment to reduce shrinkage, are useful for the production of textiles, hosiery, cordage, etc.

As many apparently widely different embodiments of this invention may be made without departing from the spirit and scope thereof, it is to be understood that I do not limit myself to the specific embodiments thereof except as defined in the appended claims.

I claim:

1. A process for obtaining improved fibers of hydrolyzed ethylene/vinyl ester interpolymer, said process comprising wet spinning into an aqueous solution of monosodium dihydrogen phosphate of specific gravity between 1.38 and 1.42 at 25° C. an aqueous solution of a hydrolyzed ethylene/vinyl ester interpolymer in which the ester is that of a monocarboxylic acid and which has at least 80% of the ester groups hydrolyzed to hydroxyl groups and having a molar ratio prior to hydrolysis of vinyl ester to ethylene of between 6:1 and 50:1, said solution containing said interpolymer in amount from 5% to 30% by weight, and containing from 2% to 10% by weight of a water soluble compound having the formula $R_nX$ where R is an aliphatic hydrocarbon radical having from 1 to 5 carbon atoms, X is a radical selected from the group consisting of —OH, —SH, —$NH_2$, =NH, and ≡N, and $n$ is an integer of from 1 to 3 whose value is equivalent to the valence of X.

2. The process set forth in claim 1 in which said aqueous solution of monosodium dihydrogen phosphate contains a cationic surface active agent in essentially saturating amount.

3. The process set forth in claim 1 in which said interpolymer is a hydrolyzed ethylene/vinyl acetate interpolymer.

4. A process for obtaining improved fibers of hydrolyzed ethylene/vinyl ester interpolymer, said process comprising wet spinning into an aqueous solution of monosodium dihydrogen phosphate of specific gravity between 1.38 and 1.42 at 25° C. an aqueous solution of a hydrolyzed ethylene/vinyl acetate interpolymer which has at least 80% of the acetate groups hydrolyzed to hydroxyl groups and having a molar ratio prior to the hydrolysis of the vinyl acetate to ethylene of between 6:1 and 50:1, said solution containing said interpolymer in amount from 5% to 30% by weight, and containing from 2% to 10% by weight of a water soluble sompound having the formula R$n$X where R is an aliphatic hydrocarbon radical having from 1 to 5 carbon atoms, X is a radical selected from the group consisting of —OH, —SH, —NH$_2$, =NH, and ≡N, and $n$ is an integer of from 1 to 3 whose value is equivalent to the valence of X, said aqueous solution of monsodium dihydrogen phosphate containing a catonic surface-active agent in essentially saturating amount.

MELVIN A. DIETRICH.

REFERENCES CITED

The following references are of record in the file of this patent:

UNITED STATES PATENTS

| Number | Name | Date |
|---|---|---|
| 2,236,061 | Izard | Mar. 25, 1941 |
| 2,386,347 | Roland | Oct. 9, 1945 |
| 2,403,464 | Smith | July 7, 1946 |